United States Patent [19]
Yamasaki et al.

[11] Patent Number: 4,509,824
[45] Date of Patent: Apr. 9, 1985

[54] PLATE LENS AND A METHOD FOR MANUFACTURING THE SAME

[75] Inventors: Tetsuya Yamasaki; Eiji Okuda; Noboru Yamamoto, all of Hyogo, Japan

[73] Assignee: Nippon Sheet Glass Co., Ltd., Osaka, Japan

[21] Appl. No.: 462,146

[22] Filed: Jan. 31, 1983

[30] Foreign Application Priority Data

Feb. 1, 1982 [JP] Japan .................. 57-14589
Feb. 1, 1982 [JP] Japan .................. 57-14590

[51] Int. Cl.³ .................. G02B 27/00; B05D 5/06
[52] U.S. Cl. .................. 350/167; 350/413; 350/416; 350/417; 427/163; 427/166; 430/321
[58] Field of Search .......... 350/96.11, 96.15, 105, 350/167, 413, 416, 417; 427/163, 166, 167; 428/428; 430/321

[56] References Cited

U.S. PATENT DOCUMENTS 3,879,110  4/1975  Furukawa ................ 350/167
4,296,143 10/1981  Franken et al. ........... 350/167
4,384,038  5/1983  Khoe et al. .............. 350/96.11

Primary Examiner—Bruce Y. Arnold
Assistant Examiner—William Propp
Attorney, Agent, or Firm—Woodcock Washburn Kurtz Mackiewicz & Norris

[57] ABSTRACT

A plate lens comprising a transparent base having two flat surfaces and having a plano-convex lens portion which is formed integrally with the transparent base, which has a refractive index greater than that of the transparent base and which has a substantially semicircular or circular section in a direction perpendicular to the flat surfaces of the transparent base. The plate lens has a light-shielding layer on one surface of the transparent base, as needed. The light-shielding layer covers one surface of the transparent base such that a transparent portion may be formed in the vicinity of a position opposing the central point or line of the plano-convex lens portion. The plate lens provides a clear and bright image and is therefore applicable to faceplates for various types of display devices, CRTs and the like. The plate lens may be mass-produced at low cost.

35 Claims, 20 Drawing Figures

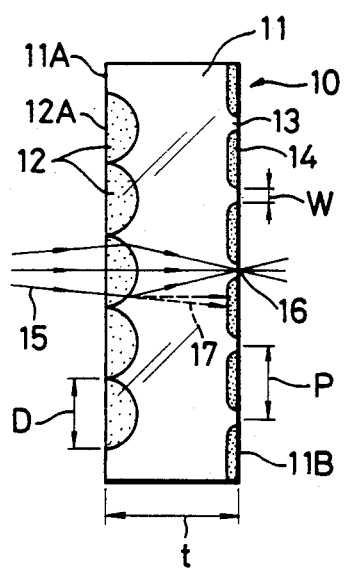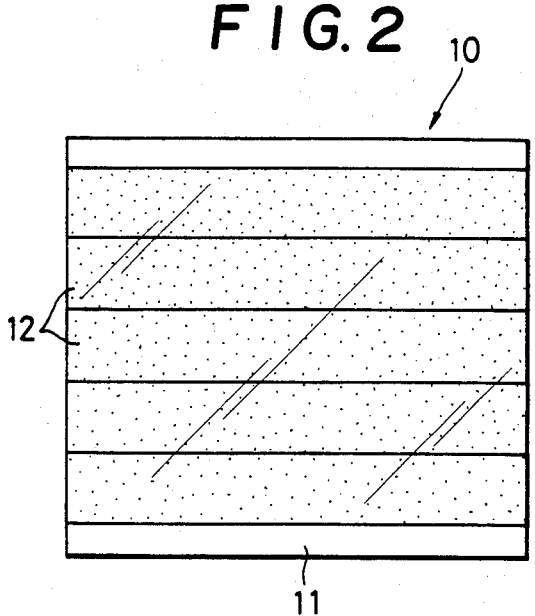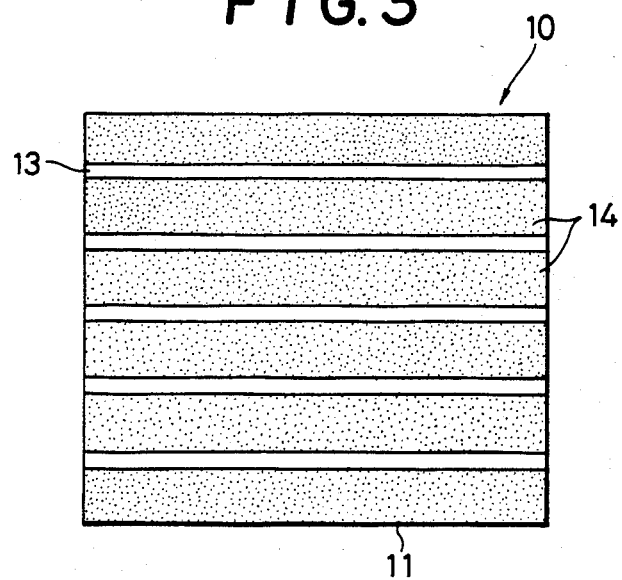

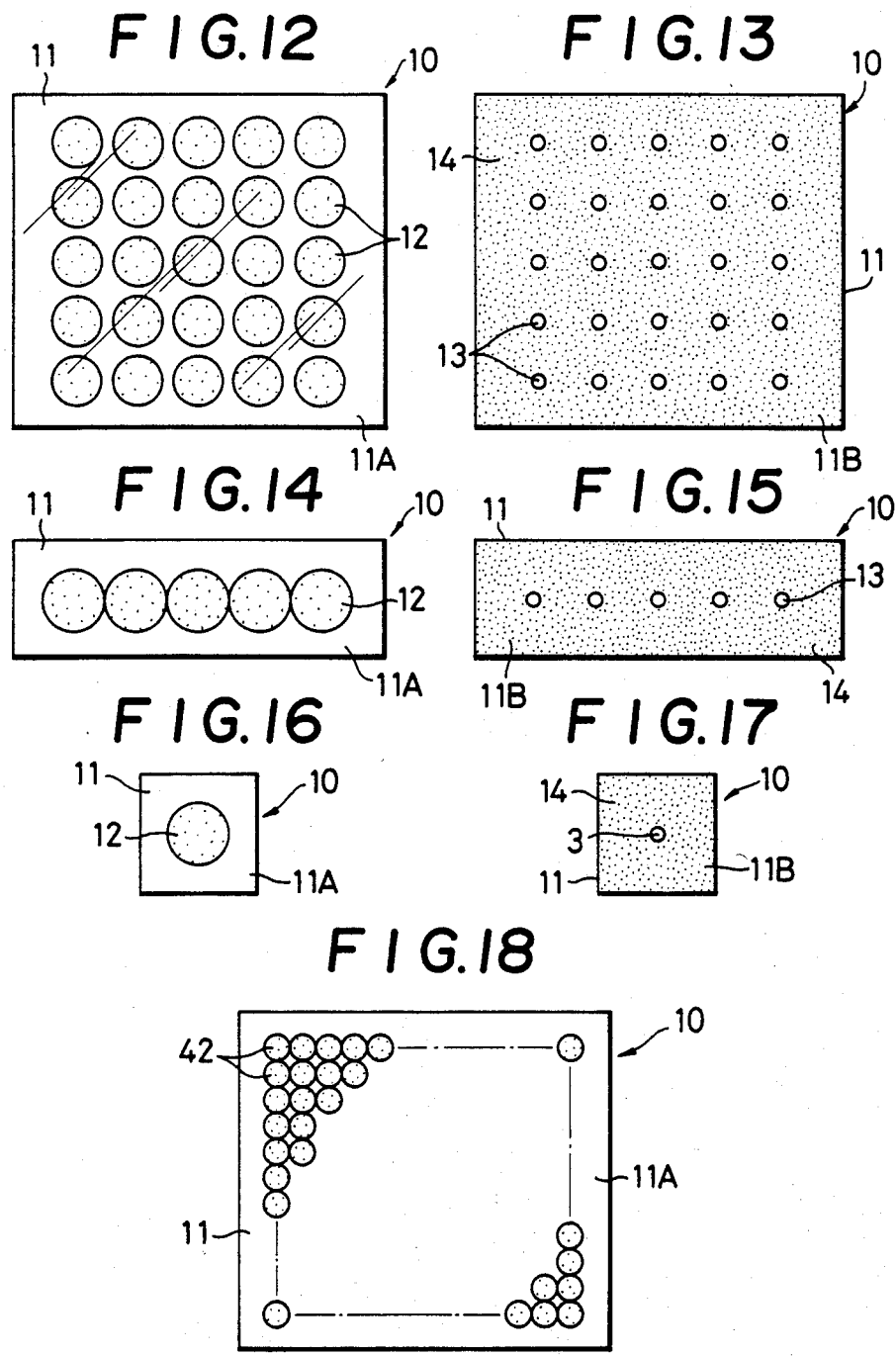

PLATE LENS AND A METHOD FOR MANUFACTURING THE SAME

BACKGROUND OF THE INVENTION

1. Field of the Invention

This invention relates to a plate lens comprising a transparent base which has flat surfaces and which serves as a lens, and to a method for manufacturing the same. The plate lens of this type may be used in various types of display devices using LEDs, faceplates of CRTs, or the like.

2. Description of the Prior Art

A CRT generally comprises a thick glass plate so as to withstand a relatively high vacuum. Light emitted from a phosphor which is coated on the inner surface of a glass plate of a faceplate of the CRT is dispersed during transmission through the faceplate. This causes interference between light emitted from adjacent portions of the phosphor and degrades the clarity of the overall image.

In view of this problem, a CRT is known which uses as a faceplate a fiber plate which is obtained by bundling a number of optical fibers parallel to each other and fusing the fibers together into a flat plate. A CRT of this type is mainly used for data transmission/reception in a facsimile system. However, with the faceplate of the type described above, the amount of light transmitted through the individual optical fiber is relatively small in relation to that of light which becomes incident on the total area of the plate, so that a satisfactory brightness may not be obtained. If small air bubbles or other foreign materials are trapped in the interface between the fused optical fibers, they impair the resistance to a high vacuum and withstand voltage characteristics of the resultant faceplate, thus rendering manufacture of the faceplate difficult. For this reason, if a faceplate of this type is to be used as a faceplate of a CRT having a relatively large area such as a TV, the faceplate becomes extremely expensive to manufacture and is not therefore practical.

Meanwhile, in a general display device which has a number of light sources such as LEDs and which selectively turn on/off to display an image, improvements in contrast of the image are desired.

OBJECT AND SUMMARY OF THE INVENTION

It is, therefore, an object of the present invention to provide a plate lens which may be suitably adapted for a faceplate for a display device, a CRT or the like, and which can form a clear and bright optical image.

It is another object of the present invention to provide a plate lens which cuts off unnecessary light to allow display or formation of a clear optical image.

It is still another object of the present invention to provide a plate lens which is inexpensive to manufacture and which may be mass-produced, and to provide a method for manufacturing the same.

In accordance with an aspect of the present invention, a plate lens comprises:

a transparent base with two flat surfaces; a plano-convex lens portion which is formed in the vicinity of one of said two flat surfaces of said transparent base to be integrally therewith, which has a refractive index greater than a refractive index of said transparent base, and which has a substantially semicircular section in a direction perpendicular to said two flat surfaces; and a light-shielding layer which is formed in the vicinity of the other of said two flat surfaces, and which covers the other of said two flat surfaces such that a transparent portion is formed at a position to oppose a central point or line of said lens portion.

In accordance with another aspect of this invention, a plate lens comprises:

a transparent base having two flat surfaces; and a plano-convex lens portion which is formed within said transparent base to be integrally therewith, which has a refractive index greater than a refractive index of said transparent base, and which has a substantially circular section in a direction perpendicular to said two flat surfaces.

In the plate lens according to any aspect of this invention described above, light sources such as phosphor layers or LEDs may be arranged on one surface of a transparent base in correspondence with individual lens portions. Then, light rays radiated from the light sources upon radiation with an electron beam or the like can be focused by the lens portions in the transparent base and from dot or linear images on the other surface or in the vicinity thereof of the transparent base. In this manner, light rays emitted from portions of small areas on one surface of the transparent base and transmitted therethrough are efficiently focused on the other surface or in the vicinity thereof of the transparent base. A clear image of high contrast may be formed without causing blurring of the spots forming the image or shading of colors. The plate lens of this invention does not have a junction plane extending throughout the direction of thickness of the transparent base as in the fiber plate above mentioned, resulting in a mechanically strong and highly reliable plate lens void of vacuum leakage.

In a plate lens of the former aspect, scattered light rays which may be transmitted through the transparent base are cut by the light-shielding layer, so that blurring of the spots forming an image and shading of colors may be prevented more effectively. In a plate lens of the latter aspect, a shorter focal length may be easily obtained.

The above, and other objects, features and advantages of the invention, will be apparent in the following detailed description of illustrative embodiments of the invention which is to be read in connection with the accompanying drawings wherein the same reference numerals are used to identify the same parts in the several views.

BRIEF DESCRIPTION OF THE DRAWINGS

FIG. 1 is a side view of a plate lens according to an embodiment of the present invention;

FIG. 2 is a front view of the plate lens shown in FIG. 1;

FIG. 3 is a rear view of the plate lens shown in FIG. 1;

FIGS. 4A to 4C sequentially show steps for manufacturing the plate lens shown in FIGS. 1 to 3, wherein FIG. 4A is a perspective view of a masked substrate, FIG. 4B is a schematic vertical sectional view showing the state of ion-migration treatment of the masked substrate shown in FIG. 4A, and FIG. 4C is a schematic side view of the masked substrate after the ion-migration treatment shown in FIG. 4B and a subsequent heat treatment;

FIG. 12 is a front view of a plate lens according to still another embodiment of the present invention;

FIG. 13 is a rear view of the plate lens shown in FIG. 12;

FIG. 14 is a front view of a plate lens according to still another embodiment of the present invention;

FIG. 15 is a rear view of the plate lens shown in FIG. 14;

FIG. 16 is a front view of a plate lens according to still another embodiment of the present invention;

FIG. 17 is a rear view of the plate lens shown in FIG. 16; and

FIG. 18 is a front view of a plate lens according to still another embodiment of the present invention.

DETAILED DESCRIPTION OF THE PREFERRED EMBODIMENTS

Figure 4A:
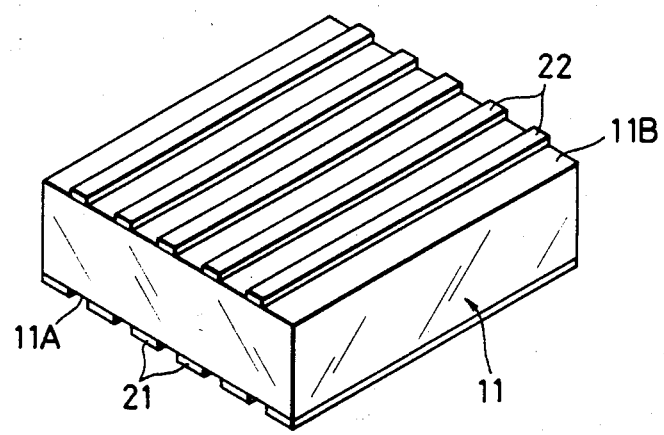

FIGS. 1 to 3 show a plate lens 10 according to an embodiment of the present invention. The plate lens 10 comprises a flat transparent base 11 which is made of a glass or a synthetic resin and which has flat surfaces. A number of lens portions 12 having a substantially semicircular vertical sectional shape are arrayed on one surface or a front surface 11A of the transparent base 11.

The lens portion 12 has a greater refractive index than that of the transparent base 11. A refractive index $N(r)$ of that part of the lens portion 12 which has a distance r from a central point or line 12A has the distribution expressed by:

$$N(r) = N0(1 - \tfrac{1}{2}Ar^2) \tag{1}$$

where $N0$ is a refractive index at the center 12A on the surface 11A of the transparent base 11, and A is a positive constant.

As described above, each lens portion 12 has a substantially semicircular vertical section as shown in FIG. 1. In the first embodiment shown in FIGS. 1 to 3, each lens portion 12 has a substantially semicolumnar shape as shown in FIGS. 1 and 2, and has the same refractive index distribution along its longitudinal direction.

The surface of the transparent base 11 on which the lens portions 12 are not formed, that is, a rear surface 11B is integrally covered with light-shielding layers 14 with alternating slit-shaped transparent portions 13 therebetween. The transparent portions 13 correspond to the focal points or caustic curve of the light rays emerging from the corresponding lens portions 12.

If the width of the transparent portion 13 is too wide, the light-shielding effect of the light-shielding layer 14 is degraded. Thus, the width of each transparent portion 16 is preferably 60% or less of that of the lens portion 12. Generally in the present invention, the diameter D of the lens portion 12 is preferable to fall within the range of 50μ to 2 mm.

In the plate lens 10 as described above, the focal points or caustic curve may be located on the rear surface 11B or inwardly or outwardly thereof of the transparent base 11. Generally in the present invention, when the thickness of the plate lens 10 is t and the distance from the focal points of the lens portion 12 to the rear surface 11B of the transparent base 11 is L (cf. FIG. 10), it is preferable for L/t to fall within the range of −50% to +50%.

When the plate lens 10 of the structure as described above is used, for example, as a faceplate of a display device, and when light-emitting elements such as LEDs are arranged in correspondence with the lens portions 12, diverging light rays 15 emitted from an LED are focused by the plano-convex lens function of the corresponding lens portion 12 and form an optical image 16 on the corresponding transparent portion 13 at the rear surface 11B of the transparent base 11.

Scattered light rays 17 which do not form the image 16 are cut off by the light-shielding layers 14. Therefore, a clear image consisting of a collected body of images 16 of good contrast may be formed.

A preferable method of manufacturing the plate lens 10 as described above will now be described with reference to FIGS. 4A to 4C.

As shown in FIG. 4A, on one surface 11A of a transparent base 11 of an alkali-containing glass is formed an ion-migration preventive mask 21 which has a pattern obtained by inverting the flat pattern of the lens portions 12 into a negative pattern. The mask 21 has a number of slit-shaped openings extending parallel to each other and may be formed by high-frequency sputtering of titanium into a titanium film of about 2 thickness, for example. On the other surface 11B of the transparent base 11 is also formed an ion-migration preventive mask 22 which is similar to the mask 21 and which has a pattern obtained by inverting the pattern of the light-shielding layers 14 into a negative pattern. Patterning of the masks 21 and 22 may be performed by a known photolithography technique.

Figure 4B:
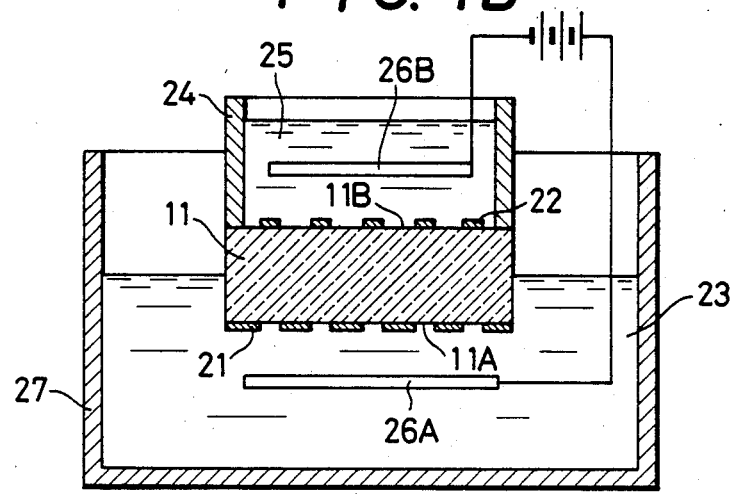

Subsequently, as shown in FIG. 4B, with the front surface 11A on which the lens portions 12 are to be formed facing downward, the masked transparent base 11 is floated in a molten salt 23 containing ions of thallium (T), cesium (Cs), lithium (Li), or the like which contribute significantly to increase the refractive index. Four sides of the surface 11B of the transparent base 11 are sealed with side plates 24 which define a rectangular cylinder. A molten salt 25, for example, a molten salt of silver nitrate containing glass coloring ions such as Ag, Cu or Au ions is filled in the space defined by these side plates 24. Reference numeral 27 denotes a tank for holding the molten salt 23 therein.

Plate electrodes 26A and 26B such as titanium plates are immersed in the molten salts 23 and 25, respectively. The molten salts 23 and 25 and the transparent base 11 are kept at a temperature of about 560° C. At the same time, a DC voltage of about 10 V is applied across the plate electrode 26A in the molten salt 23 at the side of the surface 11A as an anode and the plate electrode 26B in the molten salt 25 at the side of the surface 11B. The treatment time is about 4 hours.

As a result of such a treatment as described above, thallium ions, for example, in the molten salt 23 migrate from the surface 11A of the transparent base 11 of glass at the side of the anode into the glass. At the same time, Na ions in the glass are released from the surface 11B at the side of the cathode, and Ag ions migrate from the molten salt 25 into the glass at the side of the cathode. This is considered to be attributable to the difference in the ion diffusion speed at the two surfaces of the transparent base 11; elution speed of Na ions is fast in the glass surface at the cathode and electrical neutrality is disturbed at this glass surface, so that Ag ions contained in the molten salt at the side of the cathode diffuse in the reverse direction to that of the electric field.

Then, the horizontally extending lens portions 12 of crescent sectional shapes and having the refractive index distributions corresponding to the concentration profile of thallium ions are formed on the side of the surface 11A of the transparent base 11 at the side of the anode. Simultaneously, Ag ions are doped into the transparent base 11 through those portions of the surface 11B which are not covered by the mask 22.

After removing the transparent base 11 from the tank 27, and removing the masks 21 and 22 from the transparent base 11, the transparent base 11 is subjected to a heat treatment at about 600° C. for several to several tens of hours. Then, as shown in FIG. 4C, the sectional shapes of the lens portions 12 change from crescent to semicircular shapes, and the refractive index distributions of the lens portions 12 may approximate to relation (1) above. At the same time, the layer doped with Ag ions is colored by colloidality of Ag ions, thereby forming colored light-shielding layers 14. The light-shielding layers 14 may be formed by doping the transparent base 11 of glass with coloring ions as in the above embodiment, or by forming light-shielding films on the surface of the transparent base 11 by deposition, printing, sputtering or the like.

Typical specifications of the plate lens 10 shown in FIGS. 1 to 3 may be as follows: thickness t of the plate lens $10 = 5$ mm, diameter D of the lens portion $12 = 175\mu$, width W of the transparent portion $13 = 10\mu$, and pitch P of the transparent portions $= 175\mu$, a refractive index of the transparent base $11 = 1.513$, a refractive index at the central line 12A of the lens portion 12, that is, NO in above relation $(1) = 1.553$, and A in above relation $(1) = 6.73$.

Figure 4C:
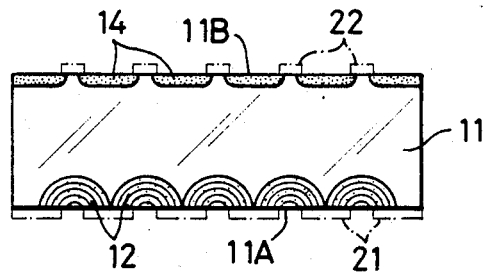
Figure 5:
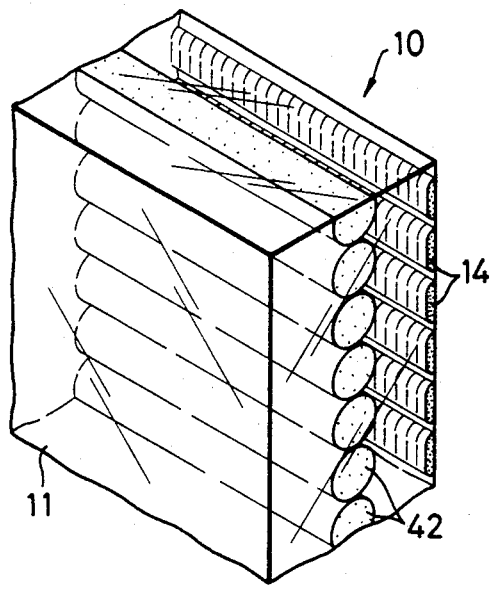
FIG. 5 is a schematic perspective view of a plate lens according to another embodiment of the present invention.

FIG. 5 shows a plate lens 10 according to another embodiment of the present invention. The common parts of this embodiment to those in the embodiment shown in FIGS. 1 to 4 have the common reference numerals.

Figure 6:
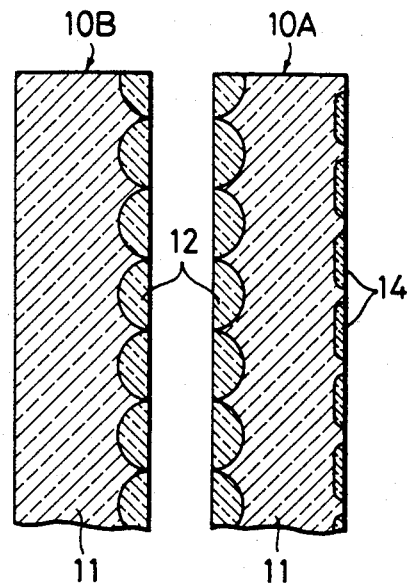
FIG. 6 is a vertical sectional view of a pair of lens plates for illustrating steps for manufacturing the plate lens shown in FIG. 5.

The plate lens 10 shown in FIG. 5 comprises a lens plate 10A with light-shielding layers 14, which is of basically the same configuration as that of the plate lens 10 shown in FIG. 1 but which has larger dimensions, and a lens plate 10B of basically the same configuration as the lens plate 10A except that the light-shielding layers 14 are not formed. More specifically, as shown in FIG. 6, the plate lens 10 is obtained by opposing a pair of lens plates 10A and 10B with lens portions 12 facing each other and by adhering them together by thermal fusion, adhering, or the like. As shown in FIG. 5, the plate lens 10 has a number of lens portions 42 of circular sectional shapes which extend horizontally at substantially the intermediate portion of a transparent base 11 in the direction of thickness thereof. These lens portions 42 are of substantially columnnar shapes and extend parallel to each other.

Figure 7:
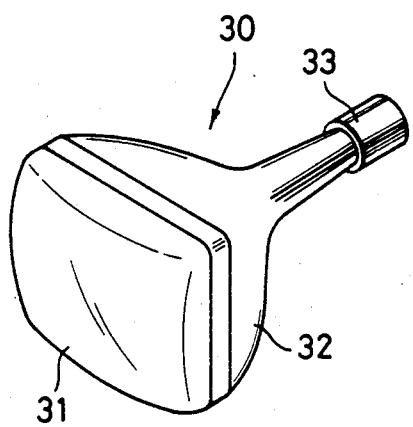
FIG. 7 is a perspective view of a CRT which uses as a faceplate the plate lens shown in FIG. 5.
Figure 8:
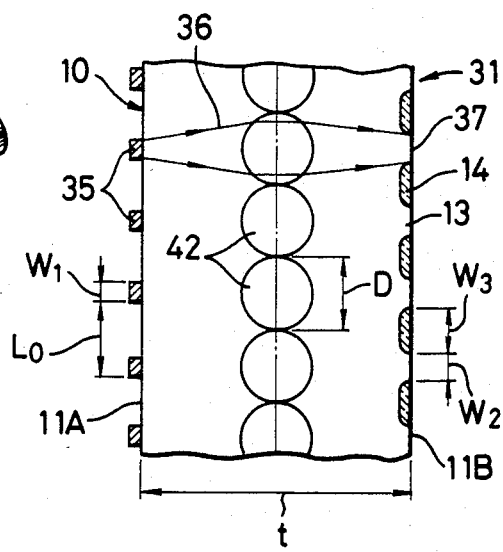
FIG. 8 is a vertical sectional view of a part of the faceplate of the CRT shown in FIG. 7.

The plate lens 10 shown in FIG. 5 may be used as a faceplate 31 of a CRT 30 as an example of an image transmission plate, as shown in FIG. 7. The plate lens 10 is adhered to the distal end of a funnel tube 32 of the CRT 30. In this case, a surface 11B of the plate lens 10 with the light-shielding layers 14 formed thereon faces outside the faceplate 31. As shown in FIG. 8, phosphor layers 35 of, for example, stripe shapes are formed on the opposite surface 11A of the plate lens 10, as in known faceplates.

In the CRT 30 as described above, when an electron beam from an electron gun 33 is irradiated onto the phosphor layer 35 to excite it, emitted light rays 36 diverge and become incident on the plate lens 10. The light rays 36 are vertically focused by the lens portion 42 of a circular section to form an image 37 on an outer surface of the plate lens 10.

Typical specifications of the faceplate 31 shown in FIG. 8 may be as follows: thickness t of the plate lens $10 = 6$ mm, diameter D of the lens portion $42 = 200\mu$, width W1 of the phosphor layer $35 = 120\mu$, pitch L0 of the phosphor layers $35 = 200\mu$, width W2 of a transparent portion 13 on the surface $11A = 120\mu$, width W3 of the light-shielding layer 14 between adjacent transparent portions $13 = 80\mu$, a refractive index of the transparent base $11 = 1.513$, a refractive index at the central line of the lens portion 42, that is, NO in above relation $(1) = 1.573$, A in above relation $(1) = 6.35$ mm$^{-2}$, and a numerical aperture of the lens $D/2f = 0.075$.

Since the lens portions 42 are of columnar shape and extend horizontally, the light rays 36 are focused only in the vertical direction and keep diverging in the horizontal direction. However, human eyes can move far faster horizontally than can move vertically. When the user overlooks the screen of the CRT 30 shown in FIG. 7 or the surface 11A of the faceplate 31, the image 37 may not be partially shielded by the light-shielding layers 14. Furthermore, focusing in the vertical direction increases brightness and allows easy recognition of the image.

It is noted that, in FIG. 8, a display panel may be obtained by using other small light sources such as LEDs in place of the phosphor layers 35.

Figure 9:
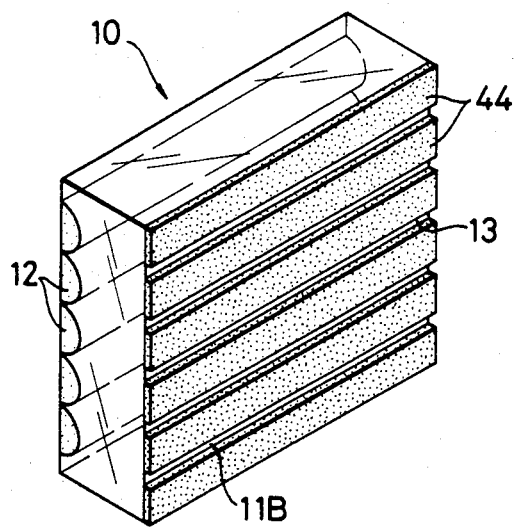
FIG. 9 is a schematic perspective view of a plate lens according to still another embodiment of the present invention.
Figure 10:
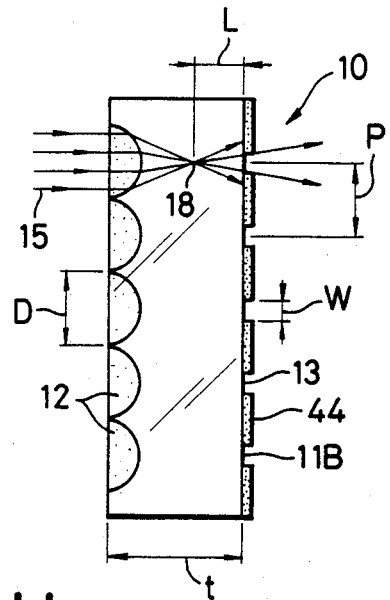
FIG. 10 is a side view of the plate lens shown in FIG. 9.

FIGS. 9 and 10 show a plate lense 10 according to still another embodiments of the present invention. In this embodiment, the common parts to those in the embodiment shown in FIGS. 1 to 4 are denoted by the common reference numerals.

The plate lens 10 shown in FIGS. 9 and 10 is obtained from the plate lens in FIGS. 1 to 3 due to replacing the light-shielding layers 14 formed integrally with the transparent base 11, with separate light-shielding layers 44 formed on a rear surface 11B of a transparent base 11. The light-shielding layers 44 have basically the same pattern as those 14 of the plate lens 10 shown in FIGS. 1 to 3. The light-shielding layers 44 may comprise metal films such as Ti films which are formed by sputtering or the like.

In the plate lens 10 shown in FIGS. 9 and 10, focal points or caustic curve 18 is located inwardly of the rear surface 11B of the transparent base 11.

Typical specifications of the plate lens 10 shown in FIGS. 9 and 10 may be as follows: thickness t of the plate lens $10 = 5$ mm, diameter D of a lens portion $12 = 175\mu$, width W of a transparent portion $13 = 10\mu$, pitch P of the transparent portions $13 = 175\mu$, distance L from the focal points of the lens portions 12 to the rear surface 11B of the transparent base 11=2 mm, a refractive index of the transparent base 11=1.513, a refractive index at the central line of the lens portion 12, that is, NO in above relation (1)=1.553, A in above relation (1)=6.73, and a numerical aperture of the lens D/2f=0.065.

Figure 11:
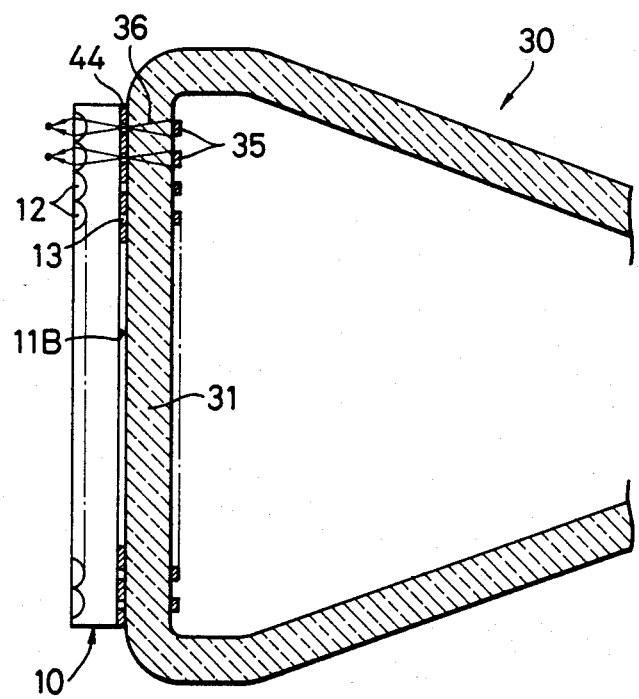
FIG. 11 is a vertical sectional view of the main part of a CRT which uses as a reflection preventive plate the plate lens shown in FIG. 9.

The plate lens 10 shown in FIGS. 9 and 10 may be used as a reflection preventive plate of a CRT 30 as shown in FIG. 11. The plate lens 10 is adhered to the front surface of a faceplate 31 of the CRT 30 such that a front surface 11A with lens portions 12 thereon may face outside. In this case, the axis of the lens portion 12 may be oriented horizontally as shown in FIG. 11; it may also be oriented obliquely or vertically. As in the case shown in FIG. 8, phosphor layers 35 of, for example, stripe shapes are formed on the inner surface of the faceplate 31. The phosphor layers 35 are arranged in one-to-one correspondence with the transparent portions 13.

In the CRT 30 shown in FIG. 11, external light rays 15 which become incident on the plate lens 10 through its front surface 10A are guided to the rear surface 11B with the light-shielding layers 44 thereon while they are focused by the lens portions 12 and diffuse again. Therefore, most of the external light rays 15 are absorbed by the light-shielding layers 44, and they are scarcely reflected by the rear surface 11B to be guided to the outside through the front surface 11A. Light rays 36 emitted by the phosphor layers 35 are guided to the lens portions 12 through the transparent portions 13 and are focused by the lens portions 12. A user watching a TV can thus observe a clear image of good contrast with practically no reflecting light and dark background of the light-shielding layers 44.

FIGS. 12 and 13 show a plate lens 10 according to still another embodiment of the present invention.

The plate lens 10 shown in FIGS. 12 and 13 may be obtained by using semispherical lens portions 12 in place of semicolumnar lens portions formed on the front surface 11A of the transparent base 11 of the plate lens 10 shown in FIGS. 1 to 3. In the plate lens 10 shown in FIGS. 12 and 13, a number of semispherical lens portions are arranged in a matrix form in a rectangular transparent base 11. Thus, the plate lens 10 has a lens matrix. Each semispherical lens portion 12 has a refractive index distribution expressed by relation (1) above in accordance with the distance r from the center of the lens portion 12 on the front surface 11A of the transparent base 11. In the plate lens of this embodiment, light-shielding layers 14 cover substantially the entire rear surface 11B of the transparent base 11 such that circular transparent portions 13 may be formed in the vicinities of the focal point of the semispherical lens portions 12, in other words, in the vicinities of portions of the optical axes of the lens portions 12.

FIGS. 14 and 15 show a plate lens 10 according to still another embodiment of the present invention.

In a plate lens 10 of the embodiment shown in FIGS. 14 and 15, only one row of semispherical lens portions 12 is formed. In this plate lens 10, one row of the semispherical lens portions 12 and one row of the circular transparent portions 13 are formed for an elongated rectangular transparent base 11.

FIGS. 16 and 17 show a plate lens according to still another embodiment of the present invention.

A plate lens 10 shown in FIGS. 16 and 17 only has one semispherical lens portion 12 similar to those of the plate lens shown in FIGS. 12 and 13. Thus, in the plate lens 10 of this embodiment, one semispherical lens portion 12 and one circular transparent portion 13 are formed in a rectangular transparent base 11.

The plate lenses shown in FIGS. 12 to 17 may also be manufactured by the method shown in FIGS. 4A to 4C; openings of ion-migration preventive masks 21 and 22 are formed in circular shapes in place of slit shapes. As in the case of the plate lens shown in FIGS. 1 to 3, the plate lenses shown in FIGS. 12 to 17 may be used for image display devices and for other similar devices. The plate lens shown in FIGS. 12 and 13 and that shown in FIGS. 14 and 15 may be used as a faceplate of a CRT in a transmission/reception device of a facsimile system, a printer or the like.

FIG. 18 shows a plate lens 10 according to still another embodiment of the present invention.

The plate lens 10 shown in FIG. 18 may be obtained by using lens portions 42 of spherical shapes in place of those of columnar shapes formed on the front surface 11A of the transparent base 11 of the plate lens shown in FIG. 5. In the plate lens 10 of this embodiment, a number of spherical lens portions 42 are arranged in a matrix form in a rectangular transparent base 11. Thus, the plate lens 10 has a lens matrix. Each spherical lens portion 42 has the refractive index distribution expressed by relation (1) above in accordance with the distance r from the center of the lens portion 12. In the plate lens 10 of this embodiment, transparent portions 13 are formed in circular shapes at positions corresponding to the centers of the spherical lens portions 42, as in the case of the plate lens shown in FIGS. 12 and 13.

The plate lens 10 shown in FIG. 18 may also be used as a faceplate 31 of a CRT 30 as shown in FIG. 7 as in the case of the plate lens shown in FIG. 5. In this case, phosphor layers 35 which are formed on the inner surface of the faceplate 31 are preferably formed in dot shapes in one-to-one correspondence with the spherical lens portions 42. Thus, a number of phosphor layers 35 are formed in a matrix form. Light rays radiating from the phosphor layers 35 or spot-shaped light sources are focused into a substantially circular spot shape in the vicinity of the front surface of the faceplate.

The plate lens shown in FIG. 18 may also be manufactured by the method shown in FIGS. 4A to 4C and 6. In this case, the openings of the ion-migrating preventing masks 21 and 22 are formed in circular shapes in place of slit-like shapes. Light-shielding layers 14 may be omitted in the plate lens 10 shown in FIG. 18, as needed.

Although illustrative embodiments of the invention have been described in detail herein with reference to the accompanying drawings, it is to be understood that the invention is not limited to such precise embodiment, and that various changes and modifications may be effected therein by one skilled in the art without departing from the scope and spirit of the invention as defined in the appended claims.

What is claimed is:

1. A plate lens comprising:
   a transparent base with two flat surfaces;
   a plano-convex lens portion which is formed in the vicinity of one of said two flat surfaces of said transparent base to be integrally therewith, which has a refractive index greater than the refractive index of said transparent base, and which has a substantially semicircular section in a direction perpendicular to said two flat surfaces; and a light-shielding layer which is formed in the vicinity of the other of said two flat surfaces, and which covers the other of said two flat surfaces such that a transparent portion is formed at a position to oppose a central point or line of said lens portion.

2. A plate lens according to claim 1, wherein said two flat surfaces are parallel to each other.

3. A plate lens according to claim 1, wherein a flat surface of said lens portions of the semicircular section which corresponds to a chord of the semicircular section is coplanar with the one of said two flat surfaces.

4. A plate lens according to claim 1, wherein said lens portion of the semicircular section has a refractive index distribution such that the refractive index is maximum at a center thereof corresponding to a center of a chord of the semicircular section and gradually decreases parabolically outwardly.

5. A plate lens according to any one of claim 1, wherein a plurality of said lens portions are arranged in one or both of a vertical direction and a horizontal direction of said transparent base.

6. A plate lens according to any one of claim 1, wherein said lens portion has a substantially semi-columnar shape and extends in a direction parallel to at least one of said two flat surfaces.

7. A plate lens according to claim 6, wherein said transparent portion is formed in a slit shape in correspondence with said lens portion of the semi-columnar shape.

8. A plate lens according to claim 6, wherein a width of said transparent portion is not more than 60% of a width of said lens portion.

9. A plate lens according to claim 1, wherein said lens portion is of a substantially semi-spherical shape.

10. A plate lens according to claim 9, wherein said transparent portion is formed in circular shape in correspondence with said lens portion of the semi-spherical shape.

11. A plate lens according to claim 1, wherein said light-shielding layer comprises a layer which is formed by doping said transparent base made of a glass with coloring ions.

12. A plate lens according to claim 1, wherein said light-shielding layer comprises a metal film which is deposited on the other of said two flat surfaces of said transparent base.

13. A plate lens according to claim 1, wherein a focal point or a caustic curve of said lens portion is located substantially on the other of said two flat surfaces of said transparent base.

14. A plate lens according to claim 1, wherein a focal point or a caustic curve of said lens portion is located inwardly of the other of said two flat surfaces of said transparent base.

15. A method for manufacturing a plate lens having a transparent base with two flat surfaces;
a plano-convex lens portion which is formed at one of said two flat surfaces of said transparent base to be integrally therewith, which has a refractive index greater than the refractive index of said transparent base, and which has a substantially semicircular section in a direction perpendicular to said two flat surfaces; and
a light-shielding layer which is formed at the other of said two flat surfaces; and which covers the other of said two flat surfaces such that a transparent portion is formed at a position to oppose a central point or line of said lens portion, said method comprising the steps of: covering the one of said two flat surfaces of said transparent base of a glass with a first ion-migration preventive mask having an opening substantially corresponding to said lens portion, and covering the other of said two flat surfaces with a second ion-migration preventive mask having an opening substantially corresponding to said transparent portion; and
bringing, through said first ion-migration preventive mask, the one of said two flat surfaces of said transparent base into contact with a first molten salt containing ions having a great contributing effect to increase the refractive index of said transparent base, thereby forming said lens portion, and simultaneously bringing, through said second ion-migration preventive mask, the other of said two flat surfaces of said transparent base into contact with a second molten salt containing glass coloring ions, thereby forming said light-shielding layer.

16. A method according to claim 15, wherein said transparent base is subjected to a heat treatment after being brought into contact with said molten salts.

17. A plate lens comprising:
a transparent base having two flat surfaces; and
a plano-convex lens portion which is formed within said transparent base to be integrally therewith, which has a refractive index greater than the refractive index of said transparent base, and which has a substantially circular section in a direction perpendicular to said two flat surfaces.

18. A plate lens according to claim 17, wherein said two flat surfaces are parallel to each other.

19. A plate lens according to claim 17, wherein a focal point or a caustic curve of said lens portion is located substantially on at least one of said two flat surfaces of said transparent base.

20. A plate lens according to claim 17, wherein said lens portion is located at substantially the center of said transparent base in the direction of thickness thereof.

21. A plate lens according to claim 17, wherein said transparent base comprises an integral unit of two transparent lens plates each having a lens portion of a semicircular sectional shape on one surface thereof, said lenses of the semicircular sectional shape of said transparent lens plates opposing each other to form said lens portion having the substantially circular section.

22. A plate lens according to claim 17, wherein said lens portion of the circular section has a refractive index distribution such that the refractive index is maximum at a center thereof corresponding to a center of the circular section and gradually decreases parabolically outwardly.

23. A plate lens according to claim 17, wherein a plurality of said lens portions are arranged in one or both of a horizontal direction and a vertical direction of said transparent base.

24. A plate lens according to claim 17, further comprising a light-shielding layer which is formed at one of said two flat surfaces, and which covers the one of said two flat surfaces such that a transparent portion may be formed at a position corresponding to a central point or line of said lens portion.

25. A plate lens according to any one of claim 24, wherein said light-shielding layer comprises a layer which is obtained by doping said transparent base of a glass with coloring ions.

26. A plate lens according to any one of claim 24, wherein said light-shielding layer comprises a metal film which is deposited on the one of said two flat surfaces of said transparent base.

27. A plate lens according to any one of claim 24, said transparent portion has a slit shape corresponding to said lens portion of a columnar shape.

28. A plate lens according to claim 27, wherein the width of said transparent portion is not more than 60% of the width of said lens portion.

29. A plate lens according to claim 24, wherein said transparent portion has a substantially circular shape corresponding to said lens portion of a spherical shape.

30. A plate lens according to any one of claim 17, wherein a light source is arranged at the other of said two flat surfaces of said transparent base to be in correspondence with said lens portion.

31. A plate lens according to claim 30, wherein said light source comprises a phosphor.

32. A plate lens according to claim 30, wherein said light source comprises a light-emitting diode.

33. A plate lens according to any one of claim 17, wherein said lens portion has a substantially columnar shape and extends in a direction parallel to at least one of said two flat surfaces.

34. A plate lens according to claim 17, wherein said lens portion is of a substantially spherical shape.

35. A plate lens according to claim 17, wherein a focal point or a caustic curve of said lens portion is located on at least one of said two flat surfaces of said transparent base.

* * * * *